US008925498B2

(12) United States Patent
Tan

(10) Patent No.: US 8,925,498 B2
(45) Date of Patent: Jan. 6, 2015

(54) EMULSION FUEL ENABLING SYSTEM AND METHOD

(75) Inventor: Sui Chuan Tan, Shenzhen (CN)

(73) Assignee: Fu You Te Chemical Technology (Shenzhen) Co., Ltd., Shenzhen, Guangdong (CN)

( * ) Notice: Subject to any disclaimer, the term of this patent is extended or adjusted under 35 U.S.C. 154(b) by 112 days.

(21) Appl. No.: 13/511,204

(22) PCT Filed: Nov. 22, 2010

(86) PCT No.: PCT/CN2010/001863
§ 371 (c)(1),
(2), (4) Date: May 24, 2012

(87) PCT Pub. No.: WO2011/060622
PCT Pub. Date: May 26, 2011

(65) Prior Publication Data
US 2012/0240875 A1     Sep. 27, 2012

(30) Foreign Application Priority Data

Nov. 23, 2009    (CN) .......................... 2009 1 0109797

(51) Int. Cl.
| F02B 43/08 | (2006.01) |
| F02D 19/06 | (2006.01) |
| F02M 25/022 | (2006.01) |
| F02M 31/16 | (2006.01) |
| F02D 19/08 | (2006.01) |

(52) U.S. Cl.
CPC ........ *F02D 19/0621* (2013.01); *F02D 19/0684* (2013.01); *F02M 25/0228* (2013.01); *F02M 31/16* (2013.01); *F02D 19/081* (2013.01); *Y02T 10/121* (2013.01); *Y02T 10/36* (2013.01); *Y02T 10/126* (2013.01)
USPC .......................................................... 123/3

(58) Field of Classification Search
USPC ...................................................... 123/3; 7/3
See application file for complete search history.

(56) References Cited

U.S. PATENT DOCUMENTS

| 4,351,301 A | * | 9/1982 | Allen | ............................. 123/557 |
| 4,732,114 A | * | 3/1988 | Binder et al. | ............... 123/25 E |

(Continued)

FOREIGN PATENT DOCUMENTS

| CN | 1287219 A | 3/2001 |
| CN | 1338025 A | 2/2002 |

(Continued)

OTHER PUBLICATIONS

Notification of Transmittal of International Search Report and the Written Opinion of the International Searching Authority for PCT/CN2010/001863, dated Mar. 3, 2011 (Forms PCT/ISA/220; PCT/ISA/210; PCT/ISA/237).

*Primary Examiner* — Lindsay Low
*Assistant Examiner* — Charles Brauch
(74) *Attorney, Agent, or Firm* — Westman, Champlin & Koehler, P.A.

(57) ABSTRACT

Disclosed are a system and a method for promoting the formation of the emulsified fuel of a diesel engine. The system includes a viscous oil-water tank; an emulsified fuel mixing device for mixing viscous oil-water with diesel fuel to obtain emulsified fuel; a dual-fuel return fuel emulsification-promoting device connecting to a diesel tank, the emulsified fuel mixing device, and the return fuel pipe and the main fuel pipe of the engine respectively; a heat-exchanging device for heating the emulsified fuel from the dual-fuel return fuel emulsification-promoting device by the cooling water of the engine; a first purifying pipe and a second purifying pipe for purifying the main fuel pipe; and a dual-fuel management device for switching between the diesel fuel supply and the emulsified fuel supply according to the temperature of the cooling water, and after the ignition switch of the engine is closed, for controlling the diesel fuel to clean up the emulsified fuel in the engine, in the main fuel pipe and in the devices. By using the system, the water content of the emulsified fuel can be up to 33% and the diesel engine can keep essentially unchanged power, start easily and run steadily.

5 Claims, 6 Drawing Sheets

(56) References Cited

U.S. PATENT DOCUMENTS

| | | | |
|---|---|---|---|
| 5,360,034 A * | 11/1994 | Der Manuelian | 137/571 |
| 5,873,916 A * | 2/1999 | Cemenska et al. | 44/301 |
| 6,949,235 B2 * | 9/2005 | Brown et al. | 423/213.2 |
| 2004/0237946 A1* | 12/2004 | Murakami et al. | 123/520 |
| 2007/0012283 A1* | 1/2007 | Rockwell et al. | 123/299 |
| 2007/0294935 A1* | 12/2007 | Waldron et al. | 44/301 |
| 2008/0035176 A1* | 2/2008 | Byers | 134/22.1 |
| 2008/0141983 A1* | 6/2008 | Takakura et al. | 123/520 |
| 2011/0297132 A1* | 12/2011 | Schremmer et al. | 123/598 |

FOREIGN PATENT DOCUMENTS

| | | |
|---|---|---|
| CN | 2627376 Y | 7/2004 |
| CN | 201212424 Y | 3/2009 |
| JP | 8-246961 | 9/1996 |
| JP | 2006-9631 | 1/2006 |

* cited by examiner

EMULSION FUEL ENABLING SYSTEM AND METHOD

CROSS-REFERENCE TO RELATED APPLICATION

This Application is a Section 371 National Stage Application of International Application No. PCT/CN2010/001863, filed Nov. 22, 2010 and published as WO 2011/060622 on May 26, 2011, in English, the contents of which are hereby incorporated by reference in their entirety.

FIELD OF THE INVENTION

This invention is targeted at diesel engine operation. It enables a diesel engine to run on either diesel or water-diesel-emulsion (WDE) fuel. This invention is applicable to diesel engines as well as diesel-fueled boilers.

BACKGROUND OF THE INVENTION

WDE is an energy-saving and emission-cutting environmental-friendly fuel i.e. it saves fuel and also reduce CO2 emission. There are a wide variety of WDE fuels available in the market. WDE has many shortcomings that need to be addressed.

1) WDE is inherently unstable—an emulsion is defined as one liquid (dispersed phase) dispersed in another liquid (continuous phase) e.g. WDE is made up of tiny water droplets (dispersed phase) dispersed in diesel (continuous phase). Since water has a higher density than diesel, gravity will cause the dispersed water droplets to descend. This, not only, occur in the fuel tank, it occur throughout the fuel supply system, from the fuel tank right through to the fuel injectors. This phenomenon compromises fuel consistency and engine performance.

2) Power loss when running on WDE. All leading WDE suppliers mention loss of engine power commensurate to its water content.

3) Viscosity of WDE at around 40 CST is significantly higher than that of pure diesel. This will adversely impact its fuel delivery rate. In other words, fuel delivery rate to the engine will be drastically reduced if no modification is done to a fuel system that is designed for diesel 4) Low speed engine instability when running on WDE.

5) The entire fuel system has to be purged of WDE before a vehicle running on WDE can resume using diesel. For instance, patent no. 03227816.0 diesel emulsion equipment mentions that an engine fitted with its invention can only run on WDE.

6) Lack of refueling facility. WDE fuels from different suppliers are incompatible with one another. Current WDE suppliers use a variety of emulsifying technologies. Emulsification formulations are like computer application software. Each proprietary formulation is unique and not compatible to one another.

7) Present emulsion fuel users are limited to city buses, boilers, ocean-going ships and power stations.

8) Present suppliers of dual-fuel equipment—WDE and diesel fuel—are incomplete solutions and unworkable. For instance, patent no. 200820089521.9 "diesel engine emulsion-fuel and diesel-fuel dual-fuel supply equipment" do not address an engine's return fuel. Return-fuel can contain air bubbles, emulsion fuel, and diesel or a combination of all three. This issue has to be addressed as it can compromise the fuel quality of whichever fuel tank it returns to. The said invention is essentially unworkable. The addition of a third tank for return fuel will face the principle of "communicating vessels" i.e. liquid levels of all communicating vessels will be the same.

9) Prior art of supplying ready-mix WDE fuel faces issues such as high product cost; fluctuating diesel price beyond the control of the WDE fuel producer will make loss-prevention difficult; production of WDE will need the approval of state regulatory bodies.

10) Engine running on WDE is difficult to start.

SUMMARY

This invention emulsion fuel enabling system and method—enables a diesel engine to seamlessly switch from diesel fuel to WDE and vice versa, without engine modification and without the above enumerated WDE application issues.

This invention comprises of the following components:

Premix Water Tank to hold Premix Water (water pre-formulated to bind with diesel to form WDE).

WDE Blending Module is connected to a Premix Water Tank and a Diesel Fuel Tank. It mixes premix water and diesel—in the proportion of 2 parts diesel and 1 part premix water—to produce WDE.

Dual-fuel Return Fuel Enabling Module is connected to a diesel fuel tank, WDE blending module, engine return fuel line and main fuel supply line.

Heat Exchange Module is connected to the main fuel supply line and the "dual-fuel return fuel enabling module". Engine coolant supplies heat to the heat exchange module to pre-heat WDE fuel.

First purge line and second purge line: The "first purge line" is connected to a diesel fuel tank and the main fuel supply line inlet. The "second purge line" is connected to the main fuel supply line outlet and the "dual-fuel return fuel enabling module".

Dual Fuel Management Module is connected to WDE blending module, "dual-fuel return fuel enabling module" and the heat exchange module via electric transmission wires and signal transmission wires. It selects the fuel type to supply to the engine according to the engine's coolant temperature. It will start the purge cycle when ignition switch is turned off i.e. the engine will continue to run for an additional time duration before finally shutting down. This is to purge WDE fuel from the main fuel supply line. The first purge route uses diesel fuel from the auxiliary fuel line to purge the engine's internal fuel system. The second purge route starts from first purge line, main fuel line, second purge line and the dual-fuel return fuel enabling tank. This is to purge WDE fuel from the main line including components forming part of the main fuel line.

Further, said premix Water Tank and Diesel Tank are connected to the WDE Blending Tank via a Static Mixer.

Further, said WDE Blending Module consists of a mixing tank, a spray misting unit, and a fluid level sensor. The spray misting nozzle is located inside the mixing tank. The fluid level sensor is also located inside WDE Blending Tank. Spray misting unit and the fluid level sensors are both linked to the management module.

Further, said Dual-fuel Return Fuel Module consists of a dual-fuel return fuel enabling tank, a return fuel valve and a fuel supply valve. Return fuel valve must be located above the fuel supply valve.

Providing a diesel engine's WDE enabling method includes steps as follow:

When the engine's ignition switch is turned on, diesel fuel is supplied from the diesel fuel tank via the auxiliary fuel line.

When the engine begins running, the dual-fuel management module will commence recirculation of residual WDE fuel inside the WDE fuel blending tank;

After a preset time duration following engine start-up, the management module will shut off the auxiliary fuel line valve and open the main fuel line valve, Fuel will be supplied via the main fuel line;

The engine's coolant temperature is continuously monitored by the management module. It selects the fuel type to supply to the engine according to the engine's coolant temperature. If the coolant heats up to a preset temperature, the dual-fuel management module will start to supply WDE. If the coolant temperature falls below the preset temperature, the management module will switch back to diesel if it is already running on WDE;

WDE fuel has to pass through the heat exchange module, where is preheated by the engine's coolant, before being supplied to the engine;

When the engine's ignition is switched off, the management module will continue to run the engine for a predetermined duration before shutting down the engine. It will close the main fuel line valve and open the auxiliary fuel line valve. Diesel fuel will be supplied to the engine via the auxiliary fuel line. This is to purge the engine's internal fuel supply system. It will simultaneously purge the main line, fuel filter, heat exchange module, and valves.

Further, Premix Water and Diesel will pass through a static mixer, where the two fluids are mixed, before going into the WDE blending module.

Further, WDE blending module produces WDE fuel on demand i.e. production of WDE will match the fuel intake rate of the engine.

Further, on-demand production of WDE includes the below-mentioned steps:

Dual-fuel management module controls the proportional feed rate of diesel and premix water into the static mixer where the two constituents are mixed before being sprayed into the WDE blending tank;

The spray mist module re-circulates tank content through the spray misting nozzles;

The Level-sensor transducer located inside the WDE mixing tank senses liquid level inside the tank and transmits this information to the management module. If WDE level reaches the preset high level, the dual-fuel management module will stop feeding more diesel and premix water to the mixing tank. The spray misting unit will continue re-circulating the contents of the mixing tank for a preset duration before stopping. If WDE liquid level reaches the preset low level, the dual-fuel management module will start feeding diesel and premix water to the mixing tank.

Further, "Dual-fuel return fuel enabling module" consists of a return fuel valve and a fuel supply valve. Return fuel valve is located at a higher position than the fuel supply valve. The fuel supply valve automatically opens when fuel level is low. It will shut when fuel level is high. Top up fuel will flow into the tank when the valve opens, and will stop flowing when the valve shuts. Top-up fuel can be diesel or WDE.

Further, the dual-fuel management module will automatically supply diesel fuel to the engine when it detects the following:
1. WDE mixing module develops a fault;
2. Engine's coolant temperature falls below preset temperature;
3. Premix Water tank level falls below preset low level;
4. Diesel fuel tank level falls below preset low level.

Compared to prior art, this invention has the following merits: high water content; no power loss; easy engine start-up; low speed engine stability; it meets fuel-saving and emission reduction objectives; no fuel incompatibility problem i.e. users can top-up with any available brand of diesel; it will open the way to the mass application of WDE and enormous business opportunities.

DETAILED DESCRIPTION OF THE VARIOUS EMBODIMENTS

The invention will further be described in details in accordance with the optimized embodiments shown in the figures.

Figure 2:
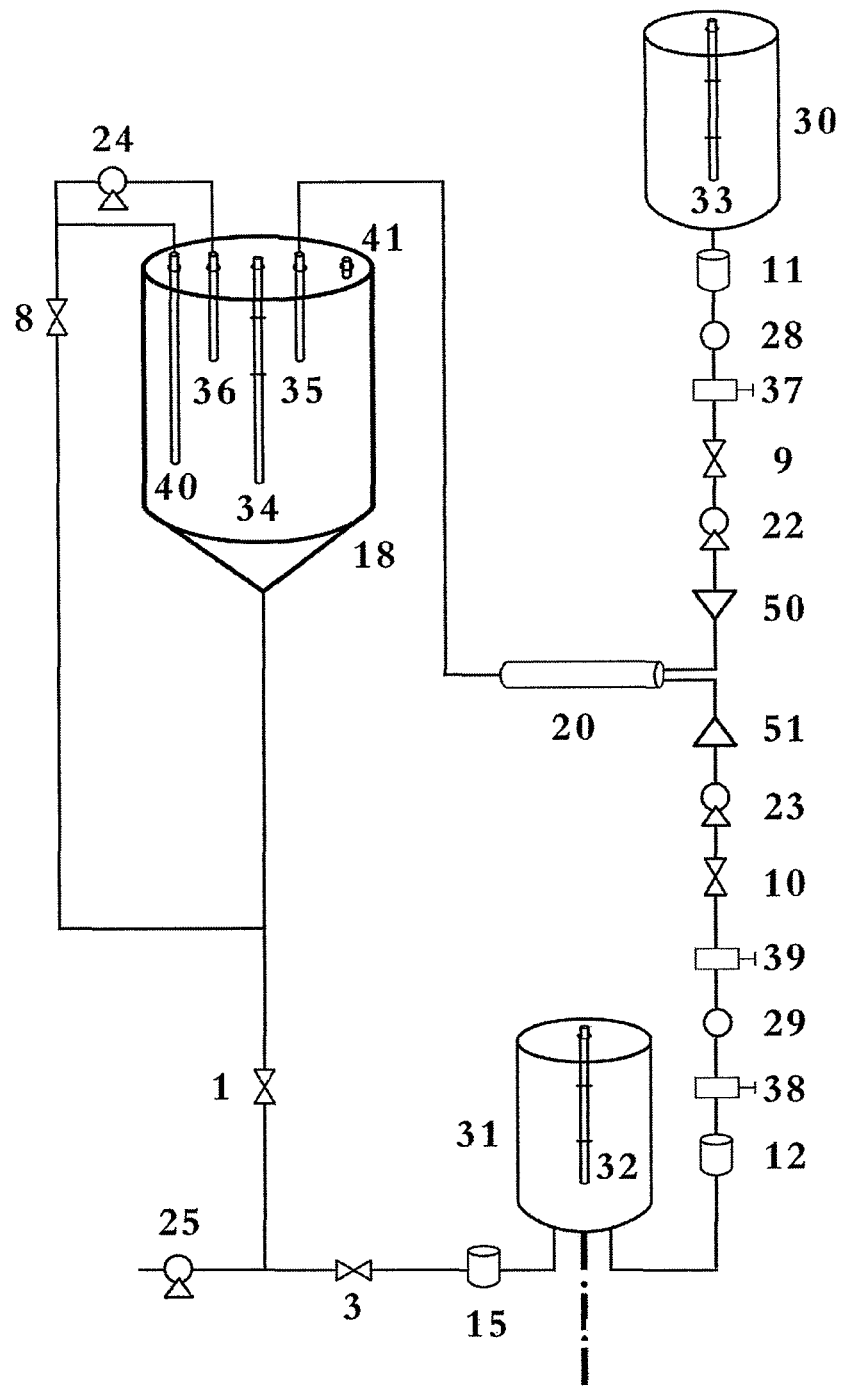
FIG. 2 refers to the schematic diagram of WDE blending module.
Figure 6:
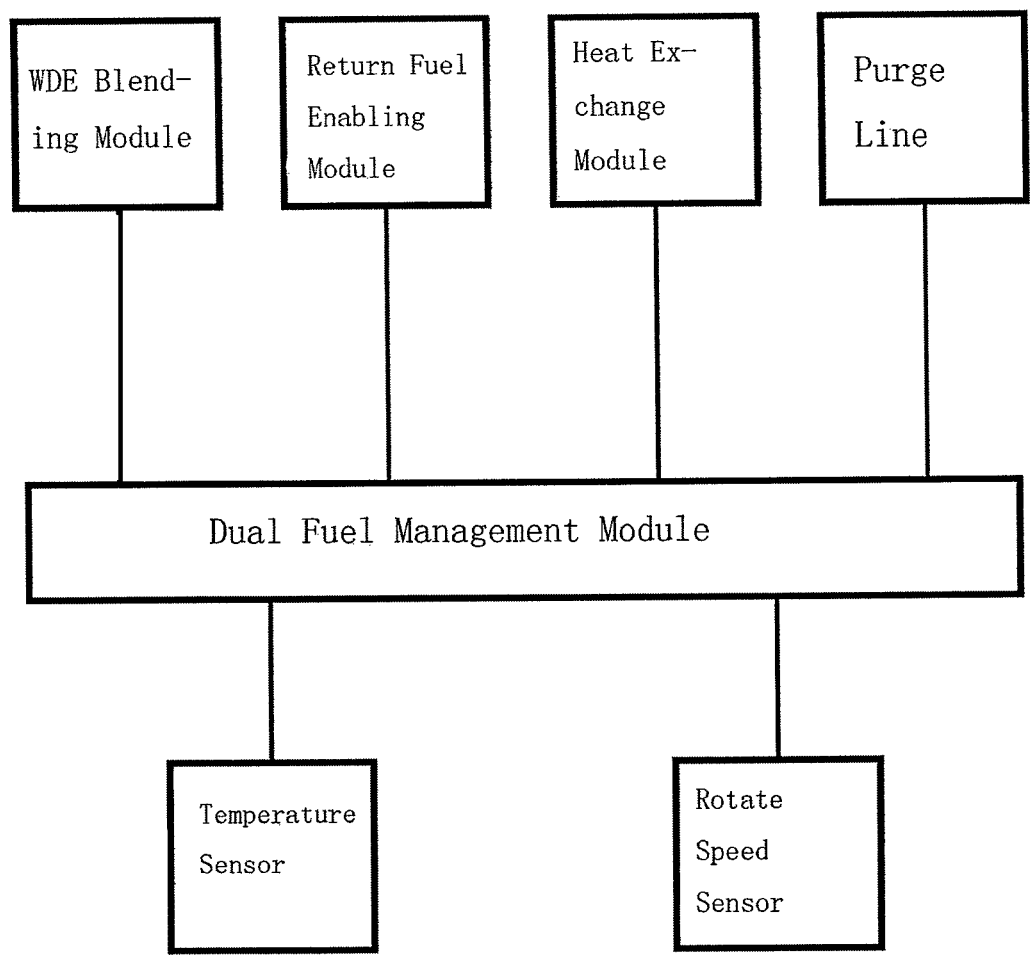
FIG. 6 refers to the schematic diagram of the dual-fuel management module.

WDE mixing module blends diesel with premix water to produce WDE. Premix Water is made up of surfactant and water in the ratio 1:40 to 90 respectively. Premix Water shortens blending time, making it possible to downsize the equipment. Oil water binding agent is a type of surfactant similar to US-made Lubrizol and Italian-made Gecam. FIGS. 2 & 6 refers to diesel engine start-up. When the engine has started running, dual-fuel management module will start re-circulating WDE content inside the mixing tank by opening valve 8 and turning on pump 24. This will re-circulate WDE content inside mixing tank via inlet 40 and misting pump 24 and through misting nozzle 36 inside mixing tank; WDE content inside mixing tank will also re-circulate through valve 8 and misting pump 24 and misting nozzle 36 into the mixing tank. After a preset duration, misting pump 24 stops, valve 8 shuts. Objective of re-circulation is to ensure WDE fuel consistency.

Valve 7 is closed during engine start-up and for preset time duration. When the engine's coolant temperature reaches a preset temperature as per transducer 49, open valve 1 and on auto-pressure on/off pump 25; close valve 3; and start to supply WDE. WDE fuel is supplied from mixing tank 18, via valve 1, auto-pressure on/off pump 25 into dual-fuel enabling module. Level transducer 34 monitors WDE level inside mixing tank 18. Step 1: When liquid level reaches low level, dual-fuel management module proportionally mixes diesel with premix water to produce WDE. Premix water and diesel mixing ratio 1:1.5-3 v/v. Premix water is supplied from premix water tank 30 via filter 11, flow meter 28, manual flow control valve, solenoid valve 9, metering pump 22, and check valve 50; diesel is supplied from diesel fuel tank 31 via filter 12, manual flow control valve 38, flow meter 29, electric flow control valve 39, solenoid valve 10, metering pump 23, and check valve 51. Both premix water and diesel enters static mixer 20, where they are mixed, and enters mixing tank through nozzle 35.

Step 2: misting process produces smaller and more uniform water droplets. Start misting pump 24, WDE enters inlet 40, via misting pump 24, and through misting nozzle 36 before entering mixing tank 18. When liquid level transducer reaches high level, it will stop blending fuel. At second preset time duration, misting pump 24 stops. WDE mixing tank low liquid level is preset at one third tank height from tank bottom.

WDE re-circulation outlet must be located below liquid level transducer's low level. Tank top has a vent valve.

Merits of WDE mixing module: 1. Premix Water production process is simple, enables easy quality control, can become a mass-sale product with extensive sales network. 2. Shortens WDE production cycle. 3. Mixing tank is divided into an upper portion where new WDE is produced and a lower portion where ready-to-use WDE is temporarily stored. This method removes the need for an additional tank to contain ready-to-use WDE, allowing equipment size reduction.

Figure 3:
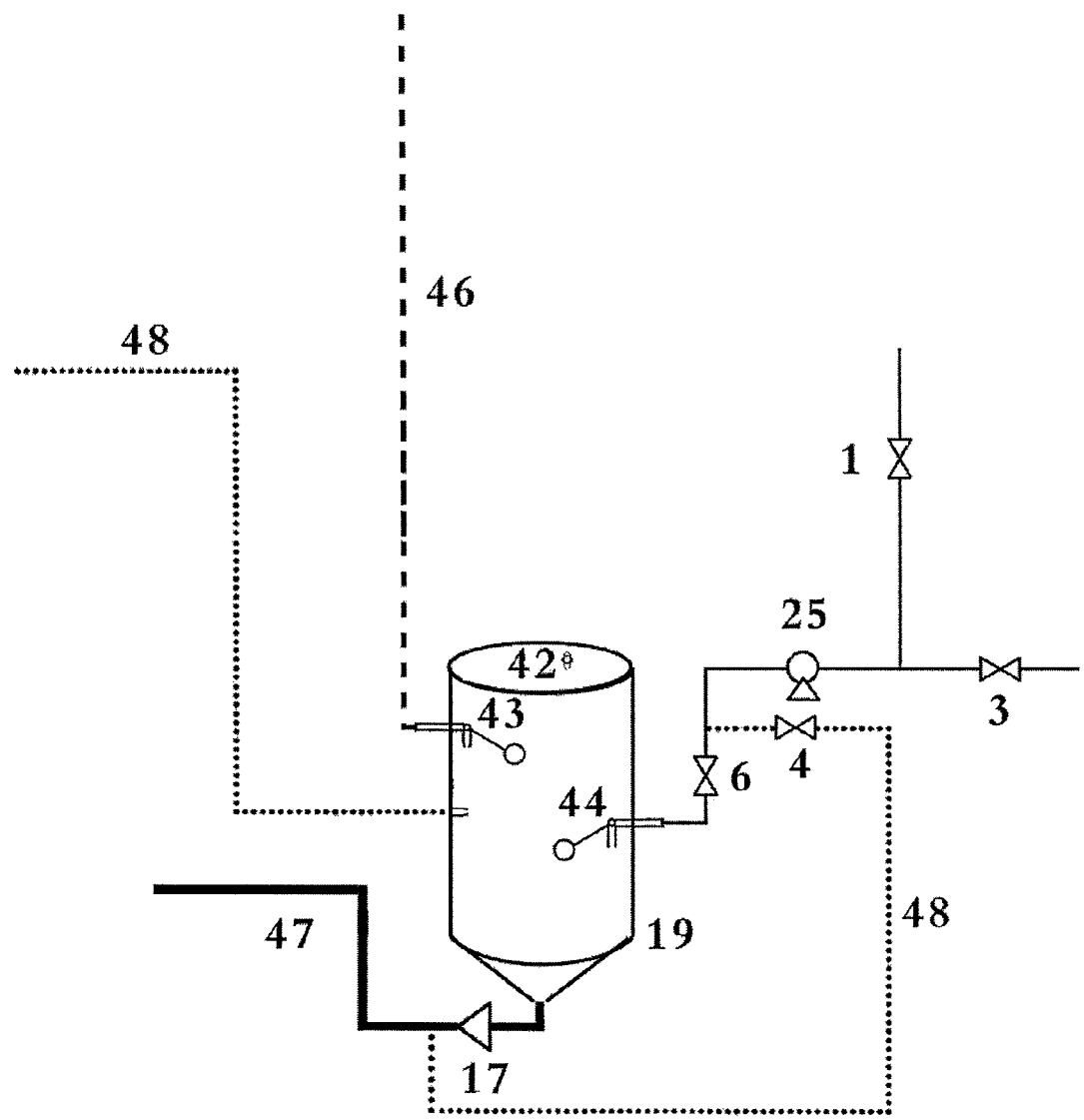
FIG. 3 refers to the schematic diagram of dual-fuel return fuel enabling module.

FIGS. 3 & 6 refers to the Dual-fuel return fuel enabling module—engine return-fuel is directed into the dual-fuel return fuel enabling tank. The two float valves or solenoid valves act as isolators to eliminate "communicating vessel" phenomenon when the diesel fuel tank, premix water tank and dual-fuel return fuel enabling tank are connected. It also enables venting of air bubbles from the return fuel. FIG. 3 refers to the return fuel line 46, return fuel valve 43, dual-fuel return-fuel enabling tank 19. Air inside return fuel is vented off via vent valve 42. Vented air-free fuel is then routed back to the main fuel line. Fuel supply valve 44 controls top-up fuel supply. Return fuel valve 43 controls engine return fuel. Return fuel valve must be located at a higher level than the fuel supply valve. Return fuel is always used first. When fuel level inside dual-fuel return fuel tank is low, fuel supply valve 44 will open, auto-pressure on/off pump starts to supply top-up fuel. Valve 44 closes when liquid level is high. When valve 44 shuts, liquid level inside dual-fuel return fuel enabling tank will not be able to reach valve 43, thus preventing the "communicating vessel" phenomenon from occurring. Using this dual-fuel return fuel enabling module has the following merits: 1. Prevent return fuel from entering diesel fuel tank or WDE mixing tank. 2. Eliminates "communicating vessels" phenomenon. 3. Vents return fuel air bubbles. 4. The auto-pressure on/off pump enable easy installation of the system on a vehicle without the constraints of gravity feed.

Figure 4:
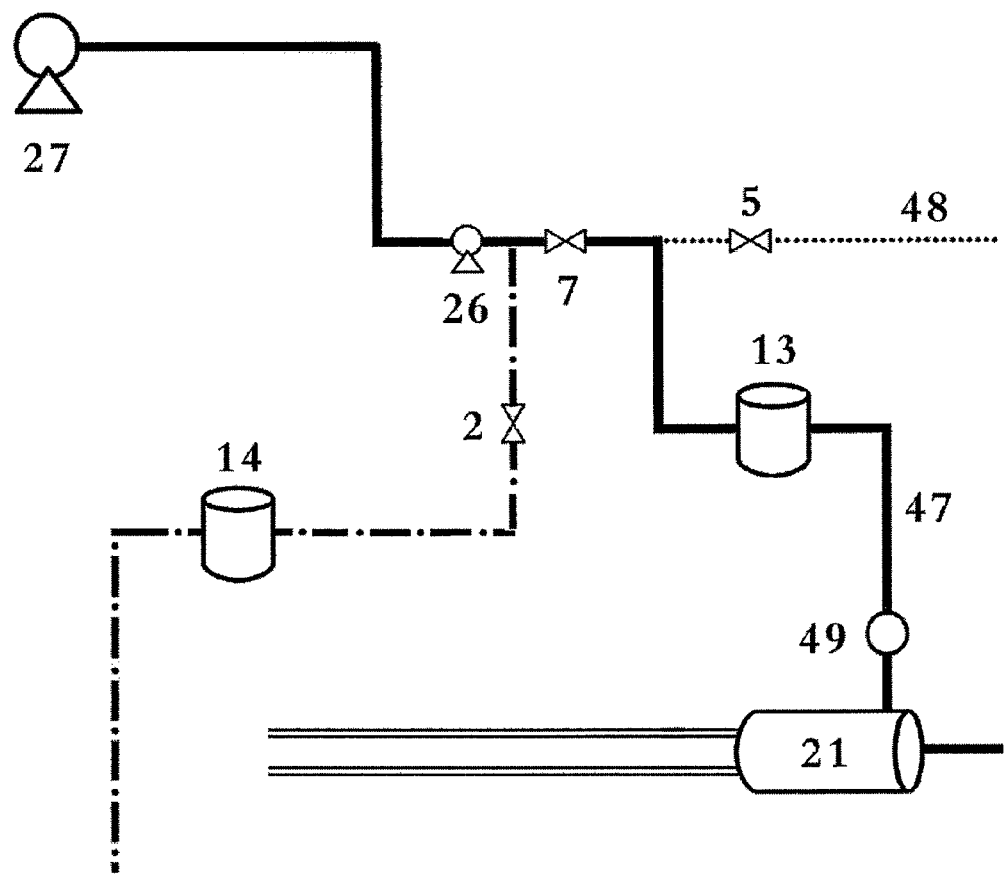
FIG. 4 refers to the schematic diagram of the heat exchange module.

Heat Exchange Module: Engine waste heat absorbed by the engine's coolant is transferred to the WDE fuel via a heat exchange. Heating WDE fuel before feeding it to the engine makes it possible to raise its water content without adversely affecting the engine's performance. Heating WDE will also lower its viscosity to improve fuel spray quality, which in turn enhances fuel combustion. Engine waste heat is removed by the engine's coolant and released via the radiator into the atmosphere. Engine operating temperature is automatically maintained at around 80 degree Celsius by its cooling system. Utilizing engine coolant to preheat WDE is both safe and environmentally friendly. FIG. 4 refers to engine start-up. When valve 7 is closed and valve 2 is opened, fuel is supplied through auxiliary fuel line 45. After a preset duration, valve 2 shuts and valve 7 opens. Fuel is then supplied through main fuel line 47. WDE is supplied when coolant temperature reaches preset temperature. WDE is preheated by the engine's coolant via heat exchange 21, and is then supplied to the engine through main fuel line 47, filter 13, solenoid valve 7, auxiliary fuel pump 26, engine feed fuel pump 27. Utilizing heat exchange module has the following merits: 1. Lowers WDE viscosity; improves fuel spray quality; and a more complete combustion. 2. Increases water content of WDE. 3. Improves WDE fuel feed rate. 4. It improves engine power output when running on WDE. 5. Low speed engine stability when running on WDE.

Figure 5:
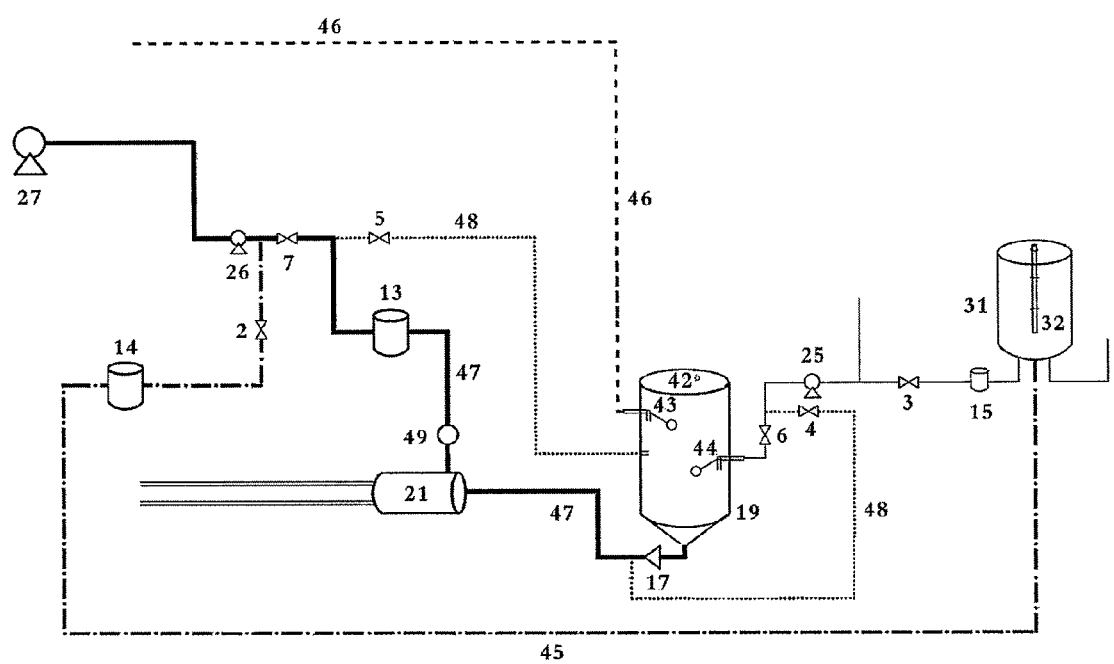
FIG. 5 refers to the schematic diagram of the purge line.

Purge Route: Engine's fuel supply line and internal fuel system are purged of WDE before shut down. Fuel injectors are purged of WDE to prevent the hot nozzles causing the water component of WDE to boil out of the emulsion fuel. Purging the fuel supply line allow a cold engine to run on pure diesel. FIG. 5 shows the locations of purge lines 1 and 2. When the ignition switch is turned off, the dual-fuel management module will delay engine shutdown for preset time duration to allow fuel line purging. First purge route: Open valve 2 and shut valve 7 to allow diesel fuel from the auxiliary fuel line to be supplied to the engine. This will purge the engine's internal fuel system of WDE fuel. Second purge route: open valve 3, 4, 5 and close valve 1 & 6 to allow diesel to be supplied from valve 3 to pump 25 which will then pump diesel through valve 4, main line 47, heat exchange 21, valve 5, purge line 2, and into tank 19. This will purge the main line and its connected components of WDE. Check valve 17 prevents diesel from flowing directly into tank 19. Purging has the following merits: 1. Prevent possible water damage to the engine. 2. Easy engine start up with diesel. 3. Main fuel line containing diesel allows a cold engine to run on diesel during warm up.

Figure 1:
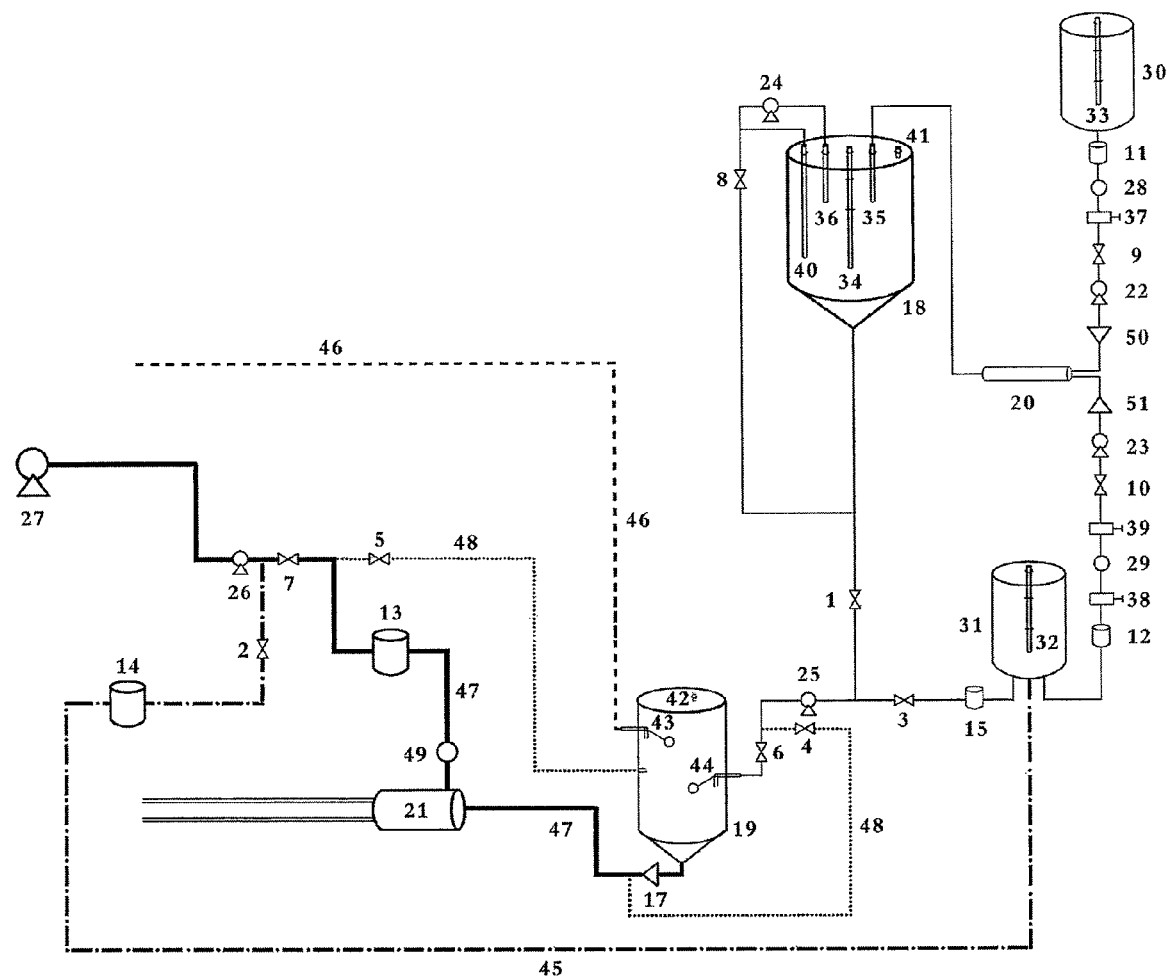
FIG. 1 refers to the schematic diagram of WDE enabling system and methodology.

Dual-fuel management module: is used to control the emulsion fuel enabling system that runs the engine. It enables the engine to seamlessly switch between diesel and WDE fuel meeting both diesel and WDE operating conditions. FIGS. 1 & 6 refers to engine operation from start up to normal running and shut down. Dual-fuel management module controls supply of diesel through auxiliary fuel line. When engine is running normally, emulsion fuel enabling system will start up. Valve 8 opens, misting pump 24 starts up, WDE fuel inside mixing tank 18 will flow into misting pump inlet 40 to misting pump 24 and on to misting nozzle 36 and back into mixing tank 18. WDE will simultaneously flow through WDE fuel supply line through valve 8, into misting pump 24, and through misting nozzle 36 into mixing tank 18. Misting pump 24 will stop and valve 8 will close after a preset duration. After a preset duration, the main fuel supply line will open and the auxiliary fuel supply line will close. Dual-fuel management module will start to supply WDE fuel when the engine's coolant temperature reaches a preset temperature. Dual-fuel management module will start supplying diesel when the engine's coolant temperature falls below a preset temperature. Dual-fuel management module will control WDE blending module's flow control valves, flow meters, and metering pumps to enable the proportional blending of diesel and premix water. Dual-fuel management module will enable the engine to continue running for a preset duration after the engine's ignition switch is turned off. This is to purge the main fuel supply line of WDE fuel. The dual-fuel management module will automatically supply diesel fuel to the engine when it detects the following:

1. WDE Blending Module develops a fault
2. Engine's coolant temperature falls below a preset temperature.
3. Premix Water tank liquid level falls below a preset level.
4. Diesel fuel tank's liquid level falls below a preset level.

Dual-fuel management module has the following merits:
1. It manages the Emulsion Fuel Enabling System
2. It manages fuel-switching between diesel and WDE. It supplies diesel during engine start up, switches to WDE when the engine's coolant heats up to a preset temperature, it purges the fuel supply line of WDE during engine shut down.
3. It will supply diesel if the emulsion fuel enabling system develops a fault.

The present invention was tested on a six-cylinder 400 hp Cummins diesel engine generator that supplies power for welding work at a shipyard. It supplies diesel fuel via auxiliary fuel supply line during engine start up. Valve 2 opens, valve 7 closes, and diesel fuel flows through auxiliary fuel supply line, filter, and the engine's fuel supply pump and onto the engine. The emulsion fuel enabling system will start up when the engine is running normally. Dual-fuel management module opens valve 8, starts misting pump 24. WDE fuel inside mixing tank will enter mixing pump inlet 40 and into misting pump 24, and through misting nozzle 36 and into mixing tank 18. WDE will simultaneously flow through WDE fuel supply line and through valve 8, into misting pump 24, and through misting nozzle 36 into mixing tank 18. Misting pump will stop and valve 8 will close 2 minutes after start up. Auxiliary fuel supply line will close; main fuel supply line will open, one minute after engine start up. Valve 3, 6, 7 open; valve 1, 2, 4 & 5 close. Diesel fuel flows through filter, automatic pressure on/off pump, main fuel supply line, dual-fuel enabling tank, heat exchanger, auxiliary fuel pump, engine's fuel pump, and thereon to engine. Dual-fuel management module will start to supply WDE when the engine's coolant temperature reaches 60 degree C. Valve 1 opens; pump 25 turns on; valve 3 will close; and start to supply WDE. WDE flows through valve 1; automatic pressure on/off pump 25; float valve 44; and into dual-fuel enabling tank 19.

Dual-fuel management module will start to blend fuel when the liquid level transducer 34 senses the liquid level inside mixing tank 18 is low. WDE fuel is blended in the proportion of 1 part premix water and 2 parts diesel. Premix water flows from premix water tank 30, filter 11, flow control valve 28, manual flow control valve 37, solenoid valve 9, metering pump 22, and check valve 50. Diesel flows from diesel fuel tank 31, filter 12, manual flow control valve, flow meter 29, electric flow control valve 39, solenoid valve 10, metering pump 23, and check valve 51. Premix water together with diesel will both flow into static mixer 20, via nozzle 35, and into mixing tank 18. Pump 24 is simultaneously turned on. WDE fuel enters inlet 40 of misting pump 24, via misting pump 24, and misting nozzle 36, into mixing tank 18. Fuel blending stops when liquid level transducer 34 detects liquid level is at high level. 2 minutes later, valve 8 close, and misting pump 24 stops.

Return fuel of generator flows from return fuel line 46, return fuel float valve 43, and into dual-fuel enabling tank 19. Air contained in return fuel is vented through vent valve 42. Air-free return fuel returns to the engine's main fuel supply line. Fuel supply float valve 44 controls supply of fuel. Float valve opens when liquid level is low. Dual-fuel management module will enable the engine to continue running for one minute after the engine's ignition switch is turned off. Purge route 1: valve 2 opens, valve 7 closes, diesel flows from diesel tank into auxiliary fuel supply line 45, filter 14, engine's fuel supply pump 27 and into engine. This will purge WDE from the engine's internal fuel system. Purge route 2: valve 3, 4, & 5 open; Valve 1 & 6 close. Diesel flows from diesel tank 31, filter 15, valve 3, automatic pressure on/off pump 25, purge line 48, valve 4, heat exchanger 21, filter 13, valve 5, and into dual-fuel enabling tank. This purge WDE fuel from the main fuel supply line 47. The engine and emulsion fuel enabling system stops after one minute. Check valve 17 prevents diesel from flowing into the dual-fuel enabling tank 19. The engine will restart using diesel. The above mentioned procedure will apply.

WDE containing 33 percent water meets fuel-saving and emission reduction objectives. Emulsion fuel enabling system solves all known shortcomings of WDE fuel. It will pave the way to mass application of WDE.

What is claimed is:

1. An emulsion fuel enabling system comprises the following components:
a premix water tank adapted to hold premix water which is made up of water and surfactant;
a WDE blending module connected to said premix water tank and a diesel fuel tank, it mixes premix water and diesel to produce WDE, said WDE blending module comprises a mixing tank, a spray misting unit for controlling emulsion fuel droplet size and a fluid level sensor, a nozzle of the spray misting unit is located inside the mixing tank, said fluid level sensor is also located inside the mixing tank, said spray misting unit and the fluid level sensors are both linked to a dual fuel management module;
a dual-fuel return fuel enabling module connected to said diesel fuel tank, said WDE blending module, an engine return fuel line and a main fuel supply line, said dual-fuel return fuel enabling module comprises a dual-fuel return fuel enabling tank, a return fuel valve and a fuel supply valve, said return fuel valve located above said fuel supply valve;
a heat exchange module connected to said main fuel supply line and said dual-fuel return fuel enabling module, engine coolant supplies heat to the heat exchange module to pre-heat WDE fuel;
a first purge line and a second purge line, said first purge line is connected to said diesel fuel tank and a main fuel supply line inlet, said second purge line is connected to a main fuel supply line outlet and said dual-fuel return fuel enabling module;
a dual fuel management module connected to said WDE blending module, said dual-fuel return fuel enabling module and the heat exchange module via electric transmission wires and signal transmission wires; it selects the fuel type to supply to an engine according to the engine's coolant temperature, it will start the purge cycle when an ignition switch is turned off; a first purge route uses diesel fuel from an auxiliary fuel supply line to purge the engine's internal fuel system, a second purge route starts from said first purge line, said main fuel supply line, and said second purge line purge WDE fuel from the main fuel supply line and components configured to the main fuel supply line;
wherein the mixing tank comprises an upper portion where new WDE is produced and a lower portion where ready-to-use WDE is temporarily stored.

2. The system according to claim 1 wherein said premix water tank and said diesel fuel tank are connected to the WDE mixing tank via a static mixer.

3. An emulsion fuel enabling method comprises the following steps:

(1) when an engine's ignition switch is turned on, diesel fuel is supplied from a diesel fuel tank via an auxiliary fuel line, when the engine begins running, a dual-fuel management module will commence recirculation of residual WDE fuel inside a WDE fuel blending tank, a WDE blending module produces WDE fuel on demand to match the fuel intake rate of the engine, wherein production of WDE fuel on demand include the below-mentioned steps;

(a) said dual-fuel management module controls diesel and premix water to be mixed before being sprayed into said WDE blending tank;

(b) a spray misting unit re-circulates mixing tank content through the spray misting nozzles;

(c) a fluid level sensor located inside the WDE blending tank senses liquid level inside the WDE blending tank and transmits this information to the dual-fuel management module, if WDE level reaches the preset high level, the management module will stop feeding more diesel and premix water to the WDE blending tank, spray misting unit will continue re-circulating the contents of the WDE blending tank for a preset duration before stopping, if WDE liquid level reaches the preset low level, the dual-fuel management module will start feeding diesel and premix water to the WDE blending tank;

(2) after a preset time duration following engine start-up, the management module will shut off the auxiliary fuel supply line valve and open the main fuel supply line valve, fuel will be supplied via the main fuel supply line;

(3) the engine's coolant temperature is continuously monitored by said dual-fuel management module, the dual-fuel management module selects the fuel type to supply to the engine according to the engine's coolant temperature, if the coolant heats up to a preset temperature, the duel-fuel management module will start to supply WDE, if the coolant temperature falls below the preset temperature, the management module will switch back to supply diesel to the engine;

(4) the engine is supplied with the WDE fuel or diesel fuel through a dual-fuel return enabling tank of dual-fuel return fuel enabling module, a return fuel valve must be located above a fuel supply valve in said dual-fuel return enabling tank, the return fuel valve is connected to an engine return fuel line;

(5) WDE fuel has to pass through a heat exchange module, where WDE fuel is preheated by the engine's coolant before being supplied to the engine;

(6) when the engine's ignition is switched off, said dual fuel management module will continue to Run the engine for a preset duration before shutting down the engine, it will close the main fuel line valve and open said auxiliary fuel line valve, diesel fuel will be supplied to the engine via the auxiliary fuel line, this is to purge WDE fuel of the engine and purge WDE fuel from the main fuel line and components configured to the main fuel line.

4. The method of claim 3 wherein premix water and diesel will pass through a static mixer, where the two fluids are mixed before going into WDE blending module.

5. The method of claim 4 wherein in the event of system failure such as one or more than one circumstances as below, said management module will automatically supply diesel fuel to the engine when it detects the following:

(1) WDE mixing module develops a fault;
(2) Engine's coolant temperature falls below preset temperature;
(3) Premix Water tank level falls below preset low level;
(4) Diesel fuel tank level falls below preset low level.

* * * * *